(12) United States Patent
Holland

(10) Patent No.: US 7,419,556 B2
(45) Date of Patent: Sep. 2, 2008

(54) METHOD OF REPAIR FOR INLET CAPS OF TURBINE ENGINES

(75) Inventor: Brian Kenneth Holland, Lansing, MI (US)

(73) Assignee: United Technologies Corporation, Hartford, CT (US)

( * ) Notice: Subject to any disclaimer, the term of this patent is extended or adjusted under 35 U.S.C. 154(b) by 324 days.

(21) Appl. No.: 11/247,617

(22) Filed: Oct. 11, 2005

(65) Prior Publication Data

US 2007/0079920 A1   Apr. 12, 2007

(51) Int. Cl.
*B29C 73/00* (2006.01)
*B32B 43/00* (2006.01)

(52) U.S. Cl. ............................ 156/98; 156/94; 156/228; 156/307.7

(58) Field of Classification Search .................... 156/94, 156/98, 285; 29/402.09, 402.11; 428/63; 264/36.1, 36.22

See application file for complete search history.

(56) References Cited

U.S. PATENT DOCUMENTS

| | | | | | |
|---|---|---|---|---|---|
| 4,926,963 | A | * | 5/1990 | Snyder | 181/290 |
| 5,087,484 | A | * | 2/1992 | Stewart | 427/239 |
| 5,190,611 | A | * | 3/1993 | Cologna et al. | 156/98 |
| 5,252,165 | A | * | 10/1993 | Fecto et al. | 156/228 |
| 5,700,743 | A | * | 12/1997 | Puchinger et al. | 442/243 |
| 5,871,604 | A | * | 2/1999 | Hohman | 156/62.8 |
| 5,958,166 | A | * | 9/1999 | Walters et al. | 156/94 |
| 6,358,014 | B1 | * | 3/2002 | Chou et al. | 416/245 R |
| 6,468,372 | B2 | * | 10/2002 | Kociemba et al. | 156/71 |
| 6,561,763 | B2 | * | 5/2003 | Breakwell | 416/94 |
| 2002/0076301 | A1 | * | 6/2002 | Yang | 411/339 |

\* cited by examiner

*Primary Examiner*—John L Goff
(74) *Attorney, Agent, or Firm*—Kinney & Lange, P.A.

(57) ABSTRACT

A method for repairing a damaged inlet cap of a turbine engine includes removing a damaged portion of a structural fiber layer positioned beneath a first erosion-resistant layer. A structural replacement layer is applied to the inlet cap to replace the removed portion of the structural fiber layer and a second erosion-resistant layer is applied to the inlet cap so that the second erosion-resistant layer is positioned over the structural fiber layer.

20 Claims, 3 Drawing Sheets

METHOD OF REPAIR FOR INLET CAPS OF TURBINE ENGINES

BACKGROUND OF THE INVENTION

The present invention relates generally to the field of turbine engine maintenance. More specifically, the present invention relates to a method for repairing an inlet cap of a turbine engine.

Turbine engines, especially those for use with airplanes, typically include an inlet cap (also referred to as an inlet cone front segment) located upstream of the air intake fan. The inlet cap is rotatably mounted to the turbine engine to affect the flow of air into the air intake fan.

Inlet caps require periodic maintenance to address wear and damage incurred by the inlet cap. Such wear or damage can be caused, for example, by birds striking the inlet cap or by particulate matter causing abrasion to exterior surfaces of the inlet cap. In addition, engine maintenance and service procedures can cause damage or wear to the inlet caps.

BRIEF SUMMARY OF THE INVENTION

The present invention includes a method for repairing an inlet cap of a turbine engine. A first erosion-resistant layer, and a portion of a structural fiber layer positioned beneath the first erosion-resistant layer, are removed from the inlet cap. A structural replacement layer is applied to the inlet cap to replace the removed portion of the structural fiber layer and a second erosion-resistant layer is applied to the inlet cap so that the second erosion-resistant layer is positioned over the structural fiber layer.

DETAILED DESCRIPTION

Figure 1:
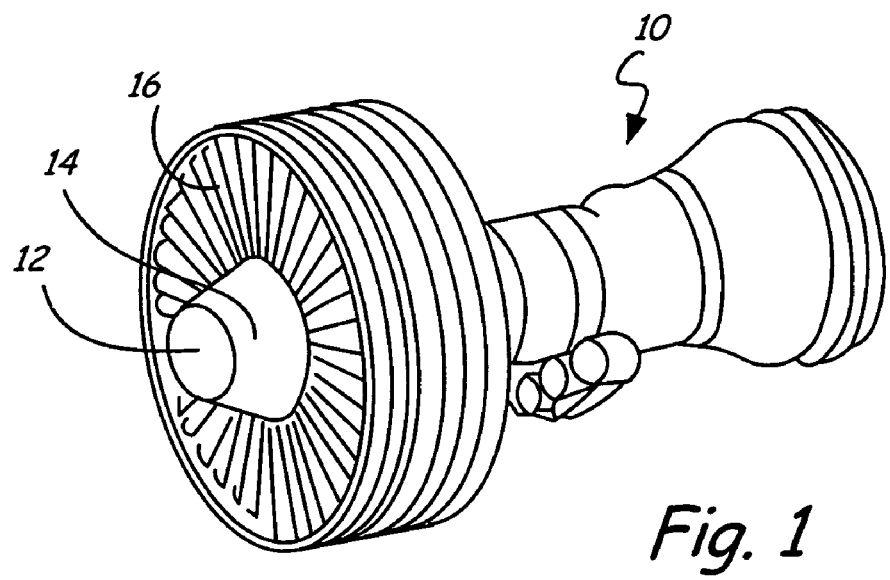
FIG. 1 is a perspective view of an airplane turbine engine including an inlet cap.

The present invention includes a method for repairing an inlet cap of a turbine engine. FIG. 1 shows turbine engine 10, which includes inlet cap 12 rotatably mounted to turbine engine 10 near rear cone segment 14 and fan blades 16.

Figure 2:
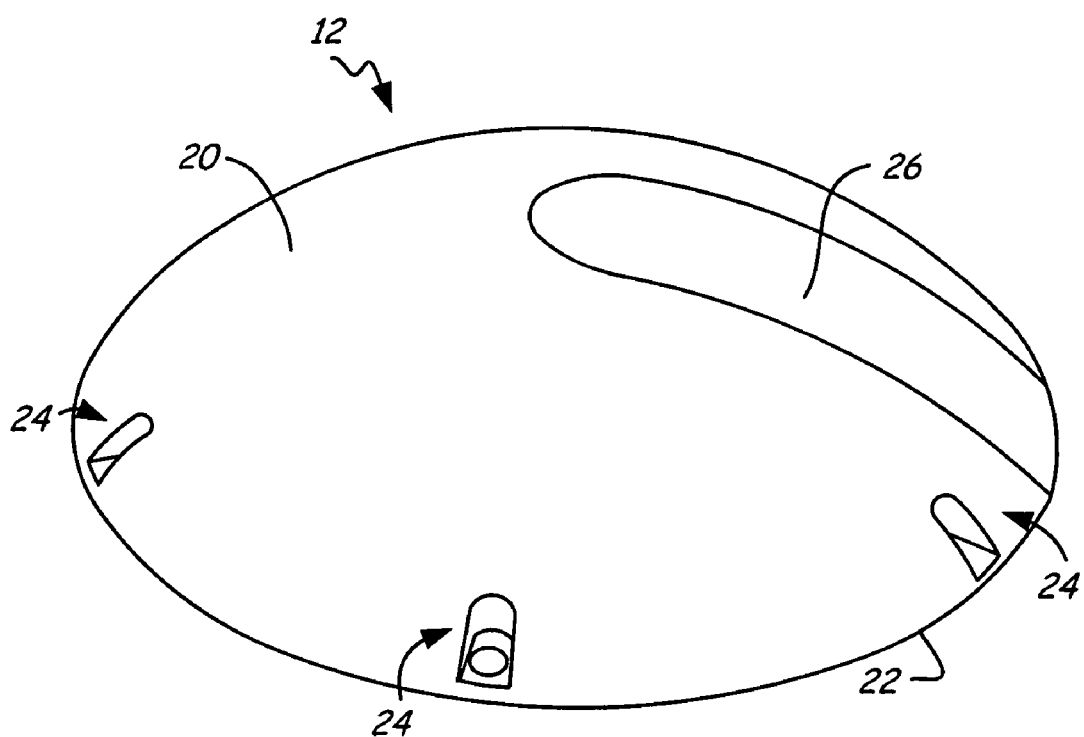
FIG. 2 is a perspective view of a front face of the inlet cap of FIG. 1.

As shown in FIG. 2, inlet cap 12 includes front face 20, rear face 22, and a plurality of lug slots 24. Lug slots 24 are designed to receive a fastener to secure inlet cap 12 relative to turbine engine 10. In addition, front face 20 includes optional marker 26, which may be included to indicate rotational movement of inlet cone 12 relative to turbine engine 10.

Figure 3:
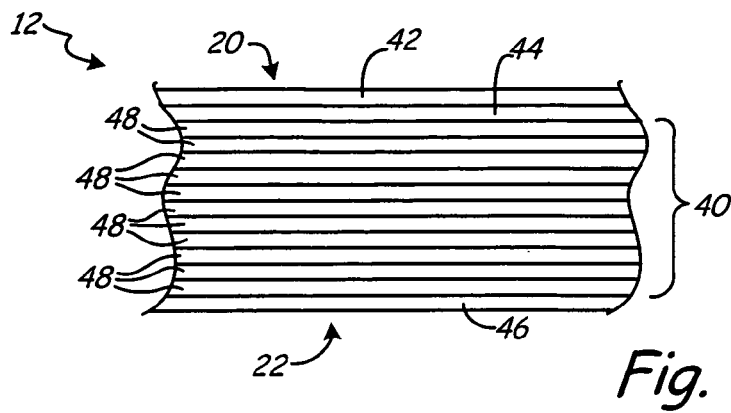
FIG. 3 is a sectional view of the inlet cap of FIG. 1.

FIG. 3 shows a section of inlet cap 12 of FIG. 2 and illustrates the construction of inlet cap 12. As shown in FIG. 3, inlet cap 12 includes structural fiber layer 40, erosion-resistant layer 42, intermediate layer 44, and backing layer 46. Front face 20 is formed by erosion-resistant layer 42 and rear face 22 is formed by backing layer 46. Structural fiber layer 40 is positioned over backing layer 46 and beneath erosion-resistant layer 42 and intermediate layer 44. Intermediate layer 44 and backing layer 46 protect structural fiber layer 40 from water intrusion and are typically formed from fiberglass.

Structural fiber layer 40 includes a plurality of constituent fiber layers 48, which typically include high-strength fibers such as, for example, aramid fiber (also referred to as aromatic polyamide fibers). In some embodiments, fiber layers 48 consist of layers of fabric that are formed from aramid fibers and impregnated with epoxy resin. In one non-limiting embodiment, inlet cap 12 includes eleven fiber layers 48.

When in service on turbine engine 10 of FIG. 1, inlet cap 12 is subjected to conditions that frequently result in damage or wear to front face 20 and/or lug slots 24 of inlet cap 12. This damage can be caused by conditions present in the operational environment of turbine engine 10 or service or maintenance activities performed on turbine engine 10. Conventional maintenance procedures are limited to replacing erosion-resistant layer 42 upon showing signs of wear. Under these conventional maintenance procedures, once damage has occurred to structural fiber layer 40 (i.e., damage to any constituent fiber layer 48), inlet cap 12 must be replaced with a new inlet cap 12.

Figure 4:
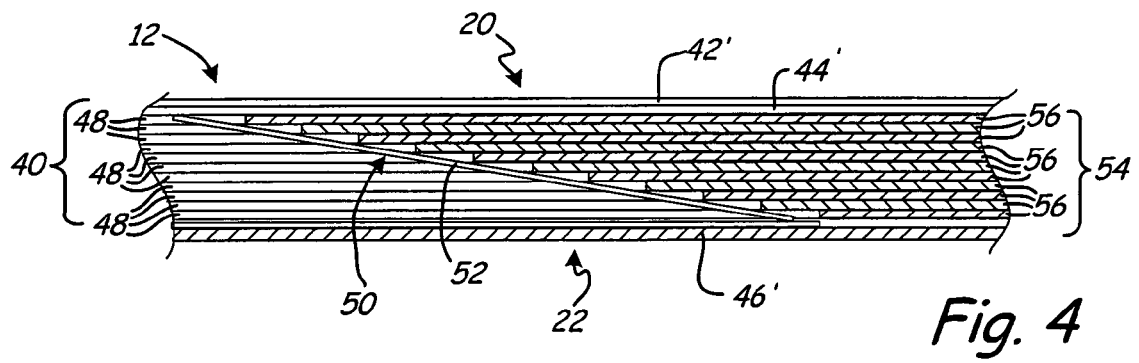
FIG. 4 is a sectional view of the inlet cap of FIG. 1 after repair of a damaged portion of the inlet cap.

The method of the present invention provides a method for repairing inlet cap 12 even when structural fiber layer 40 has been damaged, which allows many inlet caps to be repaired, rather than requiring them to be replaced. FIG. 4 illustrates an embodiment of a method of the present for replacing a damaged portion of structural fiber layer 40. FIG. 4 shows a side view of inlet cap 12 after a damaged area of inlet cap 12 has been repaired.

The method illustrated in FIG. 4 includes first removing all of erosion-resistant layer 42 and intermediate layer 44 (as shown in FIG. 3), or at least those portions of erosion-resistant layer 42 and intermediate layer 44 that are positioned over the damaged portion of structural fiber layer 40. The damaged portion of structural fiber layer 40 is then removed to create interface 50. Damaged portions of constituent fiber layers 48 are removed so that inlet cap 12 does not include any damage to structural fiber layer 40. Adhesive film 52 is applied to interface 50 and replacement structural layer 54 is applied to interface 50 to engage adhesive film 52 and replace the removed portion of structural fiber layer 40. If the damage to structural fiber layer 40 is sufficiently deep, a plurality of constituent replacement layers 56 are applied to inlet cap 12 to form replacement structural layer 54. In some embodiments, the number of replacement layers 56 applied to inlet cap 12 matches the number of removed fiber layers 48.

After the application of replacement structural layer 54, a replacement erosion-resistant layer 42' and a replacement intermediate layer 44' are applied to inlet cap 12 so that both of the layers are positioned over structural fiber layer 40 and replacement structural layer 54. In one embodiment, erosion-resistant layer 42' and intermediate layer 44' are bonded together to form a bi-layer prior to being applied to inlet cap 12.

If the damage to structural fiber layer 40 is deep enough so that portions of every constituent fiber layer 48 must be removed, some or all of backing layer 56 is removed and replacement backing layer 46' is applied to inlet cap 12 to cover all of the exposed underside of replacement structural layer 54 and, in some embodiments, all of the underside of structural fiber layer 40.

In the embodiment of FIG. 4, interface 50 is sloped or tapered to enhance the strength of the joint between structural fiber layer 40 and replacement structural layer 54. Interface 50 can exhibit a continuous slope or a step-wise slope. In some embodiments the slope of interface 50 is between about 0.25 inches and about 0.50 inches in the horizontal direction (i.e., the direction parallel to fiber layers 48) per each fiber layer 48.

Depending upon the severity of damage to structural fiber layer 40, interface 50 may extend through all of structural fiber layer 40 to backing layer 46 or to the uppermost or lower most undamaged constituent fiber layer 48. Interface 50 can be formed using any method known in the art including, for example, sanding or cutting structural fiber layer 40. In some embodiments, a cut is made around the damaged portion of each constituent structural layer 48 and the damaged portion is peeled free from structural fiber layer 40.

To enhance the strength of replacement structural layer 54, each replacement layer 56 may be applied to inlet cap 12 so that it is rotationally staggered with respect to an adjacent replacement layer 56. This rotational staggering may be with respect to any feature of replacement layers 56 including, for example, a direction or orientation related to a stitching or fiber pattern of replacement layers 56. In some embodiments, each replacement layer 56 is applied so that it is rotationally staggered by about 33 degrees relative to an adjacent layer 56. In some embodiments, each layer 56 is applied to inlet cap 12 so that its orientation matches an orientation of a removed fiber layer 48.

Any suitable material known in the art may be used to form replacement structural layer 54. Examples of suitable materials include aramid fibers, carbon fiber, fiberglass, fabrics including any of these fibers, any other high-strength fiber or fabric known in the art, and combinations of these. Examples of commercially available aramid fibers and fabrics include the KEVLAR, NOMEX, and TWARON aramid fiber products. In some embodiments of the present invention, structural layer 54 includes epoxy resin.

Figure 5:
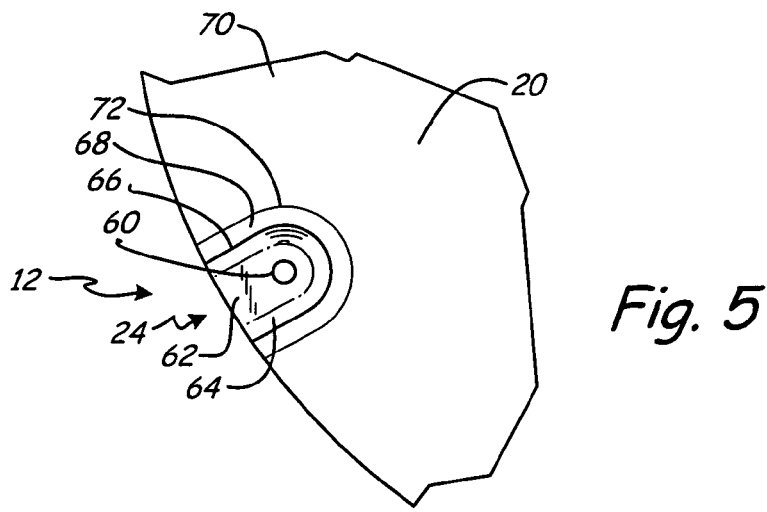
FIG. 5 is a top view of a lug slot included in the inlet cap of FIG. 1.

FIGS. 5-8 illustrate one non-limiting embodiment of the repair method described above for use in repairing a damaged lug slot 24. FIG. 5 shows a top view of lug slot 24 which is to be replaced with lug slot 24' of FIG. 8. Lug slot 24 includes hole 60, flat surface 62, transition area 64, vertical wall 66, and transition area 68. Flat surface 62 is recessed within front face 20 of inlet cap 12 (see FIG. 2) and includes hole 60 for receiving a fastener to secure inlet cap 12 relative to turbine engine 10. Transition area 64 is located on front face 20 between flat surface 62 and vertical wall 66 and transition area 68 is located between vertical wall 66 and main surface 70 of front face 20. Lug slot 24 has a construction similar to that shown in FIG. 4, with structural fiber layer 40, erosion-resistant layer 42, intermediate layer 44, and backing layer 46 extending into and forming lug slot 24 so that each of the layers exhibits a profile similar to the overall shape of lug slot 24.

Figure 6:
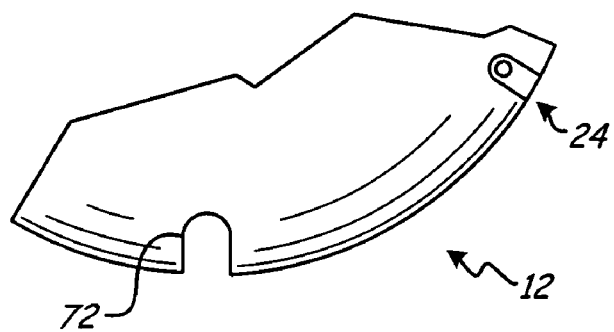
FIG. 6 is a top view of the inlet cap of FIG. 5 with a lug slot removed.

To repair a damaged lug slot 24, erosion-resistant layer 42 and intermediate layer 44 are removed from inlet cap 12 by, for example, hand-sanding. If the damage extends deep enough into structural fiber layer 40 of lug slot 24, then lug slot 24 is completely removed from inlet cap 12. For example, in some embodiments, if structural fiber layer 40 includes eleven fiber layers 48 and the damage to lug slot 24 extends more than six layers deep into structural fiber layer 40, then lug slot 24 is completely removed from inlet cap 12 (including all of backing layer 46, or at least a portion of backing layer 46 positioned beneath the damaged portion of structural fiber layer 40). Lug slot 24 can be removed using any method known in the art including, for example, cutting through inlet cap 12 from front face 20 to rear face 22 and cutting along outside edge 72 of transition area 68 until lug slot 24 is dislodged from inlet cap 12. FIG. 6 shows inlet cap 12 after a lug slot 24 has been removed by cutting along outside edge 72. In some embodiments, outside edge 72 is spaced from vertical wall 66 by a distance of at least about 0.5 inches.

Figure 7:
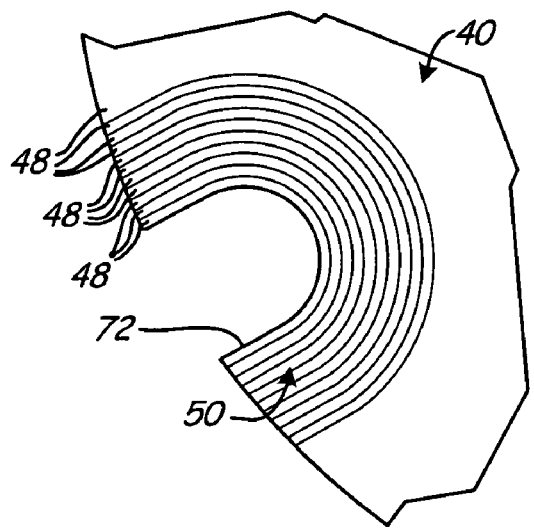
FIG. 7 is a top view of the inlet cap of FIG. 6 including a tapered interface.

Interface 50 is then cut so that interface 50 tapers (or slopes) away from front face 20, as shown in FIG. 7. In some embodiments, interface 50 is formed at the same time lug slot 24 is being removed. To obtain a uniformly roughened surface, interface 50 may be abraded with, for example, a non-metallic grit-coated cloth or paper (e.g., 180 grit or finer). Any dust caused by the abrasion process is removed from interface 50 and inlet cap 12 is dried for at least about 24 hours at a temperature of between about 170° F. and about 190° F.

Figure 8:
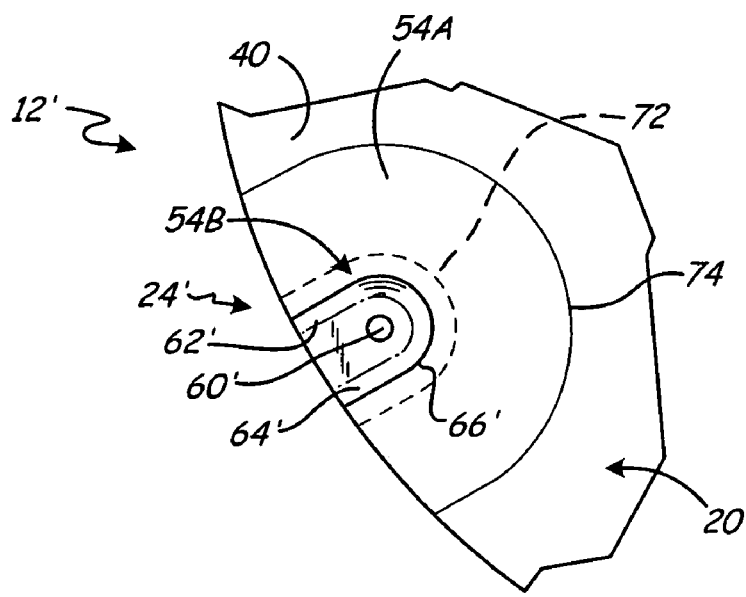
FIG. 8 is a top view of the inlet cap of FIG. 7 with a replacement structural layer applied to the tapered interface.

After drying, adhesive 52 (e.g., an adhesive film such as the HYSOL EA 9689 product commercially available from Loctite Aerospace of Bay Point, Calif.) is applied to interface 50. Replacement layers 56 are then applied to interface 50 to form portions 54A and 54B of structural replacement layer 54, as shown in FIG. 8. In most embodiments, the number of replacement layers 56 applied to interface 50 will be the same as the number of constituent fiber layers 48 removed from inlet cap 12. As discussed above, replacement fiber layers 56 may be rotationally staggered with respect to each other to enhance the strength of replacement layer 54. Backing layer 46' (see FIG. 4) is then applied beneath replacement fiber layer 56 to replace any portions of backing layer 46 that were removed. In some embodiments, backing layer 46' is formed from fiberglass such as, for example, the F161-262-120 fiberglass product commercially available from Hexcel or the CYCON 293 fiberglass product commercially available from Cytec Engineered Materials.

Inlet cap 12 is then sealed in a vacuum bag and positioned in a mold having a forward mold-part shaped to coincide with front face 20 and a bottom mold-part shaped to coincide with rear face 22. In some embodiments, the forward mold-part is composed of hard tooling such as, for example, aluminum and the rear mold part is composed of soft tooling such as, for example, silicone (e.g., the ARLON precision-calendared, uncured silicone product commercially available from Arlon - Silicone Technologies Division of Bear, Del.).

The mold/vacuum-bag assembly is placed inside an autoclave and inlet cap 12 is held in a vacuum until a pressure of between about 15 and about 20 pounds-per-square-inch (psi) is applied to inlet cap 12. The vacuum is then vented to atmosphere and a pressure of at least about 40 psi is applied to inlet cap 12. The temperature of inlet cap 12 is ramped up from room temperature to about 355° F. ± about 15° F. at a rate of between about 2° F. per minute and about 8° F. per minute. The temperature of inlet cap 12 is held at about 355° F. ± about 15° F. for about 120 minutes. The pressure applied to inlet cap 12 is then slowly released and the vacuum is reestablished when the pressure reaches about 20 psi. Inlet cap 12 is cooled until it reaches a temperature of about 150° F. and is then removed from the vacuum bag and mold.

FIG. 8 shows partially-repaired inlet cap 12', which results from the above autoclaving process. Inlet cap 12' includes tapered structural replacement portion 54A which overlaps structural fiber layer 40 (see FIG. 4) and structural replacement portion 54B which includes replacement lug slot 24'. Similar to lug slot 24' includes hole 60', flat surface 62', transition area 64', vertical wall 66', and transition area 68' (including outside edge 72).

Hole 60' is drilled in inlet cap 12' at a location matching the location of hole 60 of FIG. 5 to produce the partially-repaired inlet cap 12' shown in FIG. 8. The edges of inlet cap 12' are trimmed if necessary and the interior surface of hole 60' is sealed using a sealant such as, for example, the EA9396 sealant product commercially available from Loctite Aerospace of Bay Point, Calif. The thickness and profile of inlet cap 12' is then checked to verify compliance with the specifications for inlet cap 12'.

To finalize the repair of inlet cap 12', the materials for erosion-resistant layers 42' and intermediate layer 44' are prepared and applied to inlet cap 12'. In one embodiment, erosion-resistant coating 42' is cut from a continuous ply of a fluoroelastomer film (e.g., the 0.02 inch thick VITON fluoroelastomer product commercially available from Eagle Elastomer of Cuyahoga Falls, Ohio) and intermediate layer 44' is cut from a continuous ply of fiberglass (e.g., the CYCON fiberglass product commercially available from Cytec Engineered Materials).

In some embodiments, erosion-resistant layer 42' and intermediate layer 44' are bonded together and applied as a bi-layer assembly to inlet cap 12'. To accomplish this, the materials for erosion-resistant layer 42' and intermediate layer 44' are positioned in a bonding mold that includes a forward mold-part for engaging layer 42' and a rear mold-part for engaging layer 44'. Prior to laying the materials for layer 42' or layer 44' in the bonding mold, parting agent is applied to the forward and rear mold-parts. The material for layer 42' is then positioned into the forward mold-part followed by the material for layer 44'. A layer of peel ply is then positioned atop the material for layer 44' and the rear mold-part is positioned atop the peel ply. The bilayer-assembly is then sealed in the mold and a vacuum bag. The mold/vacuum bag assembly is then placed in an autoclave and autoclaved pursuant to the procedures described above in regards to the formation of inlet cap 12' of FIG. 8, with the exception that the temperature of the bi-layer assembly is held at a temperature of about 375° F. ± about 15° F. for between about 90 and about 120 minutes at a pressure of between about 30 psi and about 50 psi (as opposed to being held at a temperature of about 355° F. ± about 15° F. for about 120 minutes at a pressure of about 40 psi).

After the bi-layer assembly including erosion-resistant layer 42' and intermediate layer 44' has been allowed to cool, the bi-layer assembly is removed from both the mold and the vacuum bag and trimmed as necessary. The exposed surface of intermediate layer 44' (i.e., the surface that will be bonded to inlet cap 12' ) is then roughened by grit blasting with 60-120 aluminum oxide grit to produce a uniform matte texture. The grit-blasted surface of intermediate layer 44' is wiped clean and the bi-layer assembly is heated to a temperature of about 150° F. for between about 15 and about 30 minutes to remove any volatiles.

Adhesive is then applied to the exposed surface of inlet cap 12' (i.e., the exposed surfaces of structural fiber layer 40 and replacement portions 54A and 54B of replacement layer 54). An example of a suitable adhesive is the epoxy film adhesive HYSOL EA 9689 .080 PSF commercially available from Loctite Aerospace of Bay Point, Calif. The cured bi-layer assembly is then applied to inlet cap 12' so that intermediate layer 44' engages the adhesive. The resulting inlet cap 12' is the vacuum bagged and placed in the same mold that was used to form inlet cap 12' of FIG. 8. The mold/vacuum bag assembly is placed in an autoclave and inlet cap 12' autoclaved pursuant to the procedures described above for forming inlet cap 12' of FIG. 8, with the exception that the temperature of the bi-layer assembly is held at a temperature of about 250° F. ± about 15° F. for between about 90 and about 120 minutes and a pressure of between about 30 psi and about 50 psi (as opposed to being held at a temperature of about 355° F. ± about 15° F. for about 120 minutes at a pressure of about 40 psi).

The resulting inlet cap 12' is then trimmed and hole 60' is re-drilled if necessary. Front face 20 and rear face 22 are wiped clean and allowed to air dry for at least 15 minutes. The edges of inlet cap 12' are then sealed with a sealant (e.g., the PLV 2000 or PLV 2100 fluoroelastomer sealant products that are both commercially available from Pelseal Technologies of Newtown, Pa.) and air cured for 24 hours at room temperature or for one hour at room temperature and then for one hour at a temperature of about 175° F. ±25° F.

A modified version of the method described above in conjunction with FIGS. 5-8 may be used for partial replacement of lug slot 24 (i.e., where portions of some, but not all, of the plurality of constituent structural layers 48 included in lug slot 24 are removed). If the damage to structural fiber layer 40 warrants only a partial replacement of lug slot 24, then a cut is made along outside edge 72 (see FIG. 5) to a desired depth within structural fiber layer 40. For a partial repair, the cut is typically made so that it penetrates through the lowermost damaged constituent fiber layer 48.

In some embodiments, where damage has occurred to portions of structural fiber layer 40 near backing layer 46 and erosion resistant layer 42 and intermediate layer 44 have not been damaged, the repairs to structural fiber layer 40 may be conducted with respect to rear face 22 of inlet cone 12 instead of front face 20.

In some embodiments, a plurality of lug slots 24 may be replaced at the same time.

Thus, as described above, the method of the present invention provides a means for repairing an inlet cone of a turbine engine that has sustained damage to structural fiber layer located beneath an exterior erosion-resistant layer. In particular, the method of the present invention allows for a damage lug slot of an inlet cone to be either fully replaced or partially replaced, depending upon the severity of the damage to the lug slot.

Although the present invention has been described with reference to preferred embodiments, workers skilled in the art will recognize that changes may be made in form and detail without departing from the spirit and scope of the invention.

The invention claimed is:

1. A method for repairing an inlet cap of a turbine engine having a front face and a rear face, the method comprising:
    removing at least a portion of a first erosion-resistant layer from the front face of the inlet cap;
    removing at least a portion of a plurality of structural fiber layers positioned beneath the first erosion-resistant layer;
    applying at least a first and a second structural replacement layer to the inlet cap to replace the removed structural fiber layers, wherein at least the first structural replacement layer is rotationally staggered with respect to at least the second structural replacement layer;
    applying a second erosion-resistant layer to the inlet cap so that the second erosion-resistant layer is positioned over at least the structural replacement layer;
    positioning the inlet cap between a front mold and a rear mold, wherein the front mold is comprised of hard tooling and the rear mold is comprised of soft tooling; and
    applying heat and pressure to the inlet cap.

2. The method of claim 1, and further comprising:
    removing at least a portion of a backing layer from the rear face of the inlet cap; and
    applying a replacement backing layer to replace the removed backing layer.

3. The method of claim 1, and further comprising:
removing at least a portion of a damaged lug slot, wherein said damaged lug slot is located within the front face of the inlet cap and is comprised of a hole, a flat surface surrounding the hole, and a vertical wall;
replacing the damaged lug slot with at least a first structural replacement layer; and;
forming a hole through at least the first structural replacement layer.

4. The method of claim 1, and further comprising:
removing at least a portion of an intermediate layer located between the structural fiber layer and the first erosion-resistant layer.

5. The method of claim 1, and further comprising:
applying an intermediate layer to the inlet cap so that the intermediate layer is positioned over at least a first structural replacement layer and an adjacent portion of the remaining structural fiber layer and beneath the second erosion-resistant layer.

6. The method of claim 5, and further comprising bonding the intermediate layer and the erosion-resistant layer together before applying the intermediate layer and the second erosion-resistant layer to the inlet cap.

7. The method of claim 1, wherein the second-erosion resistant layer comprises a fluoroelastomer.

8. The method of claim 1, wherein at least the first structural replacement layer is rotationally staggered with respect to at least the second structural replacement layer by about 33 degrees.

9. The method of claim 1, wherein the structural replacement layer comprises an aramid fiber layer.

10. The method of claim 1, wherein the portion of the structural fiber layer is removed so that a sloped interface is formed in the structural fiber layer and the structural replacement layer is applied to the inlet cap so that it abuts the sloped interface.

11. A method of repairing a turbine engine inlet cap having a front face and a rear face, comprising:
removing a first erosion-resistant layer from the front face of the inlet cap;
removing at least a portion of a structural fiber layer positioned beneath the first erosion-resistant layer;
applying a structural replacement layer to the inlet cap to replace the removed portion of the structural fiber layer,
placing the inlet cap in a front mold shaped to coincide with the front face of the inlet cap and a rear mold shaped to coincide with the rear face of the inlet cap;
heating the inlet cap; and
applying a second erosion-resistant layer to the inlet cap so that the second erosion-resistant layer is positioned over the structural replacement layer.

12. The method of claim 11, and further comprising:
removing at least a portion of a backing layer from the rear face of the inlet cap; and
applying a replacement backing layer to replace the removed backing layer.

13. The method of claim 11, and further comprising:
removing at least a portion of a damaged lug slot, wherein said damaged lug slot is located within the front face of the inlet cap and is comprised of a hole, a flat surface surrounding the hole, and a vertical wall;
replacing the damaged lug slot with at least a first structural replacement layer; and;
forming a hole through at least the first structural replacement layer.

14. The method of claim 11, and further comprising:
removing at least a portion of an intermediate layer located between the structural fiber layer and the first erosion-resistant layer.

15. The method of claim 11, and further comprising:
applying an intermediate layer to the inlet cap so that the intermediate layer is positioned over at least a first structural replacement layer and an adjacent portion of the remaining structural fiber layer and beneath the second erosion-resistant layer.

16. The method of claim 11, wherein the second-erosion resistant layer comprises a fluoroelastomer.

17. The method of claim 11, wherein the front mold is comprised of hard tooling.

18. The method of claim 17, wherein the rear mold is comprised of soft tooling.

19. The method of claim 11, wherein removing at least a portion of a structural fiber layer forms a tapered interface in the structural fiber layer.

20. The method of claim 19, and further comprising:
applying an adhesive to the tapered interface before applying the structural replacement layer.

* * * * *